United States Patent
Fisher et al.

(12) 
(10) Patent No.: US 6,907,651 B1
(45) Date of Patent: Jun. 21, 2005

(54) MANUFACTURING AND ASSEMBLY OF STRUCTURES USING SHIMS

(75) Inventors: David Fisher, Poulton-le-Fylde (GB); Alan L Rutherford, Barton-Under-Needwood (GB)

(73) Assignees: BAE Systems plc, Farnborough (GB); Advanced Composites Group Ltd., Derbyshire (GB)

( * ) Notice: Subject to any disclaimer, the term of this patent is extended or adjusted under 35 U.S.C. 154(b) by 401 days.

(21) Appl. No.: 09/623,681
(22) PCT Filed: Aug. 16, 2000
(86) PCT No.: PCT/GB00/03165
§ 371 (c)(1), (2), (4) Date: Sep. 7, 2000
(87) PCT Pub. No.: WO01/14208
PCT Pub. Date: Mar. 1, 2001

(30) Foreign Application Priority Data

Aug. 21, 1999 (GB) ................................ 9919787

(51) Int. Cl.[7] ................................ B23Q 17/00
(52) U.S. Cl. ................ 29/407.05; 29/402.06; 29/402.19; 29/445
(58) Field of Search ................ 29/407.05, 879.1, 29/897.2, 402.06, 402.09, 402.19, 445

(56) References Cited

U.S. PATENT DOCUMENTS

| 3,609,116 A | 9/1971 | Thomas et al. |
| 4,478,915 A | 10/1984 | Poss et al. |
| 4,861,643 A | 8/1989 | Scollard |
| 5,385,050 A | 1/1995 | Roberts |

*Primary Examiner*—David P. Bryant
(74) *Attorney, Agent, or Firm*—Nixon & Vanderhye P.C.

(57) ABSTRACT

The invention relates to a method of assembling a structure, particularly those structures requiring very tight tolerances. The structure may be assembled by positioning shim material on at least part of a sub-structure, curing the shim material in situ, machining the cured shim material to a desired thickness, and then assembling outer layer parts to the sub-structure such that the shim material is situated between the substructure and the outer parts. The shim material may be machined to different thicknesses at different locations on the sub-structure, so that, when assembled, the outer layer parts together conform to a predetermined profile. This is especially advantageous in the manufacture of airframes, where the outer layer panels must provide a smooth surface to avoid unwanted aerodynamic effects.

11 Claims, 1 Drawing Sheet

MANUFACTURING AND ASSEMBLY OF STRUCTURES USING SHIMS

This application is the U.S. national phase of international application PCT/GB00/03165, filed in English on Aug. 16, 2000 which designated the U.S. PCT/GB00/03165 claims priority to GB Application No. 9919787.3 filed Aug. 21, 1999. The entire contents of these applications are incorporated herein by reference.

BACKGROUND OF THE INVENTION

1. Field of the Invention

The present invention relates to the manufacture and assembly of structures, particularly those structures having an outer layer or skin secured to or supported by a sub-structure and where the outer layer is required to conform within close tolerances to a predetermined profile.

2. Discussion of Prior Art

It is often desirable to assemble such structures by first providing the sub-structure, or skeletal framework, and then attaching panels to the sub-structure to form the outer layer or skin.

This type of structure is common in the design and manufacture of aircraft where light-weight, high strength structures are required. In this industry it is additionally necessary to ensure that all the parts of the structure are manufactured within tight tolerances and furthermore that the parts fit together so that the assembled structure meets stringent accuracy requirements.

Any out of tolerance parts or inaccurately fitted parts will cause the adjacent parts being assembled to be fitted out of their required place in the structure, rendering the structure unacceptable. It is also important that adjacent parts of the outer skin do not have a step between them so that the constituent panels and skins of the outer layer of the aircraft structure are flush with one another. Failing to provide a substantially smooth aircraft outer layer can result in unwanted aerodynamic effects such as increased drag or turbulence.

To meet the strict tolerances required in aircraft construction for example the underlying substructure may be made from machinable aluminium or titanium. The sub-structure may then be machined as necessary to allow outer skins or panels to be fitted to it without adjacent skins or panels having a step between them. This method is not desirable as any machining errors may cause the whole sub-structure to fail a quality assurance inspection and be rejected with consequent cost and time penalties. Additionally underlying sub-structures are increasingly being made from lightweight composite materials such as carbon fibre reinforced plastics (CFRP) and these materials are not readily machinable.

A method of producing structures to high accuracy requirements is known, and can be used with sub-structures made of either metal or CFRP. In this method, the surfaces of sub-structure to which panels are to be attached are coated with a filled, two component liquid adhesive material, with aluminium added to it. The liquid adhesive is cured on the sub-structure, and is then machined to a desired thickness before the panels or skins are fixed to the sub-structure. The cured adhesive may be machined to different thicknesses at different locations on the sub-structure so that, when the panels or skins are fixed to it there is substantially no step between adjacent panels or skins.

Whilst this method produces structures having profiles with acceptable accuracy, it has several disadvantages. Adhesive of this type is a viscous liquid which must be applied carefully to the sub-structure by hand using a spatula, so that it is distributed reasonably evenly with the desired thickness and without creating air bubbles in the adhesive. Too much adhesive will result in a longer wait for curing and more time spent in machining than necessary. Adhesive of this type is difficult to apply in desired quantities because of its viscosity and furthermore, there are health and safety implications associated with its use. Personnel must be trained to use such adhesive and must be careful when applying it to the substructure. Also special tooling must be manufactured, tailor made for each area to be panelled, to prevent the liquid adhesive from spreading to areas where it is not required, and to give guidance as to the thickness of the adhesive being applied. Because of the nature of this type of adhesive, the tooling must be coated with a release agent before use and cleaned thoroughly after use. Repeated exposure to this coating and cleaning process causes the tooling to deteriorate rapidly after a relatively low number of uses, resulting in time lost and expense in manufacturing and fitting replacement tooling.

SUMMARY OF THE INVENTION

The present invention seeks to provide a method of assembling structures having an outer layer supported by a sub-structure, and where the outer layer is required to conform, within close tolerances, to a predetermined profile, without the need to machine the sub-structure directly and avoiding the disadvantages of using a two-component liquid adhesive material.

According to the present invention in one aspect thereof, there is provided a method of assembling a structure comprising at least the steps of providing a sub-structure, positioning shim material on at least part of the sub-structure, curing the shim material disposed on the sub-structure, machining the cured shim material to a desired thickness, and assembling an outer layer with the sub-structure such that the shim material lies substantially between the outer layer and the sub-structure.

The shim material is preferably cured at low temperature, at below 80° C. for example.

The shim material is advantageously provided preformed, for example in the form of a film or a sheet. The film or sheet may be pre-cut so as to be suitable for direct use in particular applications, for example it may be supplied in pre-cut gasket form for use between parts having pre-determined matching dimensions.

The film or sheet may be formed in a range of thicknesses. Alternatively, several layers of shim material may be positioned on the sub-structure to achieve the desired thickness of shim material. Advantageously the shim material has a thickness in the range 0.4 to 4.0 mm.

The shim material preferably is formulated to have sufficient tackiness for allowing it to stick to surfaces on which it is positioned, even if the surfaces are vertical or on the underside of the sub-structure.

The shim material preferably has viscosity such that it substantially does not flow during the heating process up to a cure temperature of 80° C.

Advantageously the shim material is thixotropic, giving minimal flow and slump but being capable of amalgamation at butted joints, at ambient temperatures of between 10° C. and 35° C.

The shim material preferably is capable of being stored for several months at −18° C. in a stable state such that substantially no curing takes place.

Curing may be effected by exposure of the shim material to ultra violet light or radio frequency radiation.

The outer layer may comprise at least two parts, where each outer layer part is intended to be assembled with the sub-structure and each outer layer part is to be assembled substantially adjacent one or more other outer layer parts.

The shim material may be machined to different thicknesses at different locations on the sub-structure so that, when assembled to the sub-structure the outer layer parts together conform, within predetermined tolerances, to a predetermined profile. The thickness of each outer layer part is advantageously measured prior to machining the shim material. The desired thickness of the shim material at a given location is dependent upon the thickness of the outer layer part which is to be assembled with the sub-structure at that location.

The shim material preferably comprises at least a resin, a filler and a curing agent. The resin may be any material capable of forming a stable matrix on curing. Suitable resins may be polyesters, urethanes, acrylics, epoxies, vinyl esters or phenolics, for example. Preferably the resin is an epoxy resin. Advantageously the epoxy resin is a Bisphenol A based epoxy resin.

The filler may be an inert material such as talc, calcium carbonate, aluminium silicate, dolomite, alumina trihydrate, wollastonite or glass fibres. In addition the filler may comprise light weight glass microballoons, cenospheres, phenolic microballoons, perlite, hollow ceramic spheres or other plastic spheres. In addition the filler may comprise metallic substances such as aluminium powder, air release agents such as silanes or surfactants, and adhesion promoters such as organosilanes or titanates. The filler is advantageously chosen to be capable of aiding a subsequent machining process.

The shim material preferably comprises a thixotropic agent such as, for example, silicon dioxide, hydrogenated caster oil, sepiolite, bentonite clays, attapolgite clays or diatomaceous earths.

Advantageously the curing agent is a substituted imidazole. Alternatively the curing agent may be an amine, a boron trifluoride complex or a dicyandiamide with a substituted urea accelerator. Preferably the curing agent is 1-methyl imidazole. The curing agent is preferably present at a level of 2 to 10 parts per hundred by weight.

Adhesion improving agents, for example organosilanes, titanates or modified rubbers, may be added to enhance the adhesive quality of the shim material if desired.

The sheet of shim material may be stored in the freezer until it is required for use.

BRIEF DESCRIPTION OF THE DRAWINGS

Embodiments of the Invention will now be described, by way of example only, and with reference to the following drawings and examples.

Figure 1:
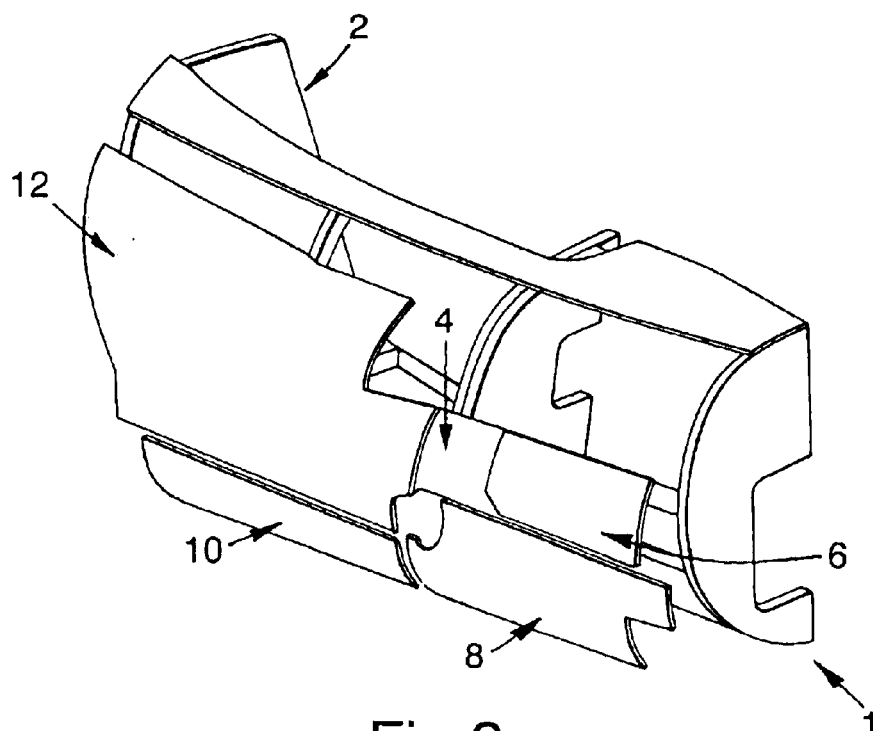
FIG. 1 shows an exploded isometric sketch of a sub-structure and parts for assembly into an aircraft structure.

Referring now to the drawings in which the same features are denoted by common reference numerals:

DETAILED DISCUSSION OF EMBODIMENTS

FIG. 1 shows a structure 1 of part of an aircraft comprising a sub-structure 2 and several outer layer parts 4, 6, 8, 10, 12 to be fitted to the sub-structure 2. The parts and the sub-structure may be formed from metal or carbon fibre composite, as desired. The parts 4, 6, 8, 10, 12 and sub-structure 2 are all manufactured and assembled with adherence to strict tolerance limits.

Figure 2:
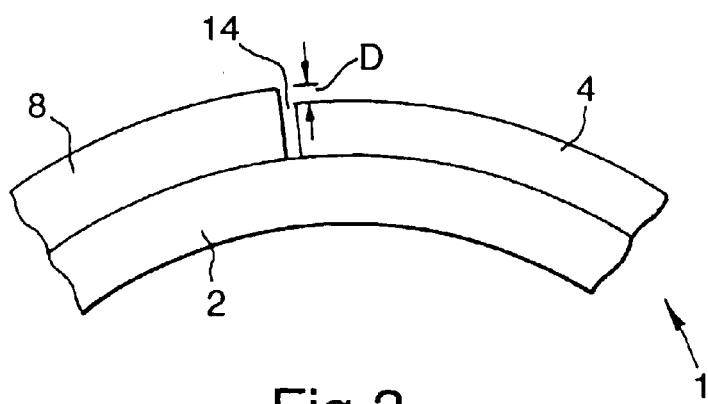
FIG. 2 shows a section through a prior art assembly of the sub-structure and parts shown in FIG. 1.

FIG. 2 shows part of the structure 1 comprising parts 4 and 8 which form part of the outer layer of an aircraft. Parts 4 and 8 may be outer skins or detachable panels. Using a prior art method of assembly the parts 4, 8 are fixed to sub-structure 2 with a gap 14 between them. Parts 4, 8 are wet assembled to the substructure 2 using PRC (polysulphide rubber compound) to prevent liquid ingress, the PRC seeping into the gap 14 during assembly. The PRC is applied to the sub-structure before the parts 4 and 8 are assembled to it.

Due to the cumulative dimensional tolerances of the sub-structure and the parts resulting from their individual manufacture, there is a step D between adjacent parts 4 and 8, which results in unwanted aerodynamic effects which can affect the performance of the aircraft. For aircraft applications it is typically preferable to have a step D of less than 0.5 mm between adjacent parts.

Figure 3:
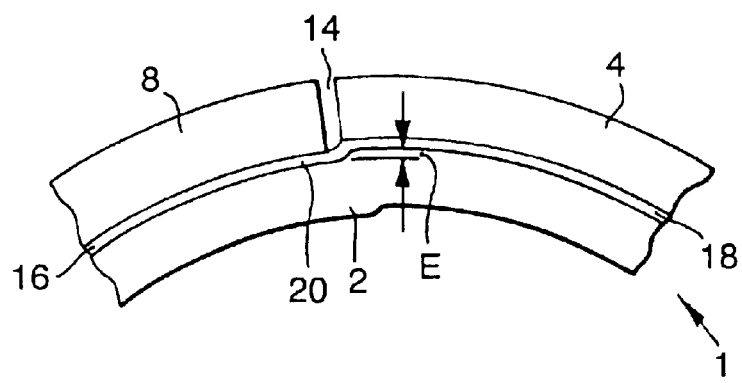
FIG. 3 shows a section through an assembly of the sub-structure and parts shown in FIG. 1 utilising an embodiment of the present invention, Example 1 describes a material suitable for use as shim material, for example, in the assembly shown in FIG. 3, and Example 2 describes a method of producing the material of Example 1.

FIG. 3 shows part of the same structure 1 comprising parts 4 and 8 which form part of the outer layer of an aircraft structure. As before the parts 4 and 8 may be outer skins or detachable panels and in this example are designed to be of different thicknesses, both panels being within their respective tolerances. The sub-structure 2 is designed to be machined to a profile which is designed to accommodate the different design thicknesses of parts 4 and 8 such that, when assembled, parts 4 and 8 should be substantially flush with one another, so that steps such as D shown in FIG. 2 are no greater than 0.5 mm. The step E represents the difference in thickness between parts 4 and 8. However, due to variation of the substructure profile, and the cumulative dimensional tolerances of the substructure and the parts 4, 8 a step D would inevitably occur if the prior art method of assembly described above were to be used. However to counter step D, a layer of shim material 20 is introduced between sub-structure 2 and the parts 4 and 8. The shim material is machined to allow parts 4, 8 to be substantially flush when assembled on the substructure, reducing step D to less than 0.5 mm.

Using our new method of assembly the layer of shim material 20 of 2 mm thickness is stuck to the sub-structure 2. The shim material 20 is formulated to have a tackiness that allows it to stick to surfaces on which it is positioned, even if the surfaces are vertical or on the underside of the sub-structure. The shim material may be cured to a machinable condition at 21° C. under atmospheric pressure in 12 hours. Alternatively the shim material may be cured to a machinable condition in 1 hour at 65° C. The heating may be achieved by a hot air gun, using hot rollers, an oven, bank of heaters, a gas thermocatalytic heater or other conventional heating methods.

The shim material substantially does not flow when heated, and so tools for providing boundaries are not required for this method of assembly.

After the shim material 20 is cured, it is machined using conventional machine tools by a desired amount. To determine the desired amount, the actual thicknesses of parts 4 and 8 are first determined and the location on the shim material 20 on which the parts will be positioned is identified. In this example part 4 is to be positioned at location 18 and part 8 at location 16. The shim material 20 is then machined by differing amounts at locations 18 and 16 respectively, so that the actual profile of the assembly is within tolerance of the datum profile of the assembly. It should be noted that any variations In the surface of the sub-structure 2 or thickness of parts 4 or 8, which might contribute to a step between attached parts 4 and 8, are substantially eliminated by the application of the shim material 20 and its subsequent precision machining.

The shim material 20 is kept in a freezer to prevent curing until it is required for use.

The shim material does not chemically react or otherwise interfere with sealant, such as cured PRC or a cured two part adhesive material, used as a filler to fill cracks and voids in the substructure.

The shim material is self-amalgamating, i.e. when strips of shim material are laid side by side adjacent each other they coalesce. Self amalgamation is temperature and time dependent and preferably occurs within 1 hour at 65° C. The flow characteristics of the shim material may be altered by varying the relative amounts of ingredients.

A material suitable for use as a shimming material, and which may be used in the method described with reference to FIG. 3 is a thixotropic filled resin material with a specifically controlled tack which allows strong adherence to vertical or inverted surfaces and facilitates full wetting of the substructure without air entrainment, the filled resin material incorporating a curing agent. An example of such material is as follows

EXAMPLE 1

| Ingredient | Parts by Weight |
| --- | --- |
| Bisphenol A based epoxy resin | 100 |
| Talc filler | 40 |
| Hollow glass microspheres | 25 |
| Fumed silica (thixotropic agent) | 6 |
| Aluminium powder | 5 |
| Air release agent | 0.5 |
| 1-Methyl imidazole (curing agent) | 6 |
| Adhesion Improving Agent (Organosilane) | 0.1 |

An example of a method for producing the material described in Example 1 will now be described by way of example only.

EXAMPLE 2

Pre-heat the Bisphenol A epoxy resin to a temperature at which the viscosity is sufficiently lowered for filler to be incorporated. This temperature will be dependent upon the nature of the epoxy resin and the power rating of the mixing equipment, and will be typically approximately 120–160° C.

Add in the talc filler, heat in a vacuum to degas the mixture and stir.

Add in the glass spheres, degas the mixture and stir.

Add in the air release agent, the adhesion improving agent and the aluminium powder and degas the mixture.

Add in the fumed silica.

Cool the mixture to below 60° C. (preferably to 48° C.) and degas.

Add the curing agent.

Discharge the mixture, a rollable dough-like substance, on to film forming equipment such as a reverse roll coater, knife over roller coater, extruder or conveyor press.

Form film of desired thickness, incorporating a supporting scrim material if required, and keep the shim material at refrigerated temperatures to prevent curing, until the shim material is required for use.

The shim material may be supplied in suitable lengths of material of selectable starting thickness, or it may be supplied in the form of pre-cut "gaskets" designed to fit the surfaces of the sub-structure to accommodate panels of various shapes. It should be curable at 65° and have a useable life out of refrigeration of at least 12 hours. The scrim material improves the fatigue life of the shim material, and strengthens the shim material. The scrim material ideally weighs 10–50 g/m$^2$ and is incorporated into one side of the film during manufacture of the shim material. The scrim material is preferably brightly coloured so that an operator can see which side of the film incorporates the scrim material and use it as a 'witness' mark during machining of the shim. During use, it is advantageous to position the film such that the supporting scrim material is adjacent the sub-structure and so does not get machined away following curing of the shim material.

It will now be apparent to one skilled in the art that characteristics of the shim material may be altered to suit different applications by changing the relative amounts of ingredients. For example, to alter flow characteristics or adhesive characteristics the ratio of filler to resin may be varied. As another example, the density of the shim material may be altered by varying the amounts of different filler materials relative to each other.

What is claimed is:

1. A method of assembling a structure comprising at least the steps of:

providing a sub-structure, positioning shim material on at least part of the sub-structure, said shim material comprising one of a film and sheet of preformed shim material, curing the shim material disposed on the sub-structure, machining the cured shim material to a desired thickness, and assembling an outer layer with the sub-structure such that the machined shim material lies substantially between the outer layer and the sub-structure.

2. A method as claimed in claim 1 wherein the shim material is cured at below 80° C.

3. A method as claimed in claim 1 wherein the curing is effected by exposure of the shim material to ultra violet light.

4. A method as claimed in claim 1 wherein the curing is effected by exposure of the shim material to radio frequency radiation.

5. A method as claimed in claim 1 wherein the outer layer comprises at least two parts and the thickness of each outer layer part is measured prior to machining the shim material.

6. A method as claimed in claim 5 wherein the shim material is machined to different thicknesses at different locations on the sub-structure so that, when assembled to the sub-structure, the outer layer parts together conform, within pre-determined tolerances, to a pre-determined profile.

7. A method as claimed in claim 1 wherein the film or sheet of shim material is pre-cut into a shape suitable for direct use in a particular application prior to the shim material being positioned on the sub-structure.

8. A method as claimed in claim 1 wherein the film or sheet of shim material has a thickness in the range 0.4 to 4.0 mm.

9. A method as claimed in claim 1 wherein the shim material is positioned on a vertical surface of the sub-structure.

10. A method claimed in claim 1 wherein the shim material is positioned on the underside of the sub-structure.

11. A method as claimed in claim 1 wherein the shim material substantially does not flow during curing at temperatures of up to 80° C.

* * * * *